(12) United States Patent
Cradit et al.

(10) Patent No.: US 9,638,314 B2
(45) Date of Patent: May 2, 2017

(54) ECO LUBRICATION METHOD FOR A TRANSFER CASE

(71) Applicant: BorgWarner Inc., Auburn Hills, MI (US)

(72) Inventors: Jeremy L. Cradit, Grand Blanc, MI (US); Christopher J. Kowalsky, Windsor (CA); Kristoffer Nilsson, Lund (SE); Daniel Kent Rosengren, Helsingborg (SE); John Rode, Swartz Creek, MI (US)

(73) Assignee: BorgWarner Inc., Auburn Hills, MI (US)

( * ) Notice: Subject to any disclaimer, the term of this patent is extended or adjusted under 35 U.S.C. 154(b) by 40 days.

(21) Appl. No.: 14/806,769

(22) Filed: Jul. 23, 2015

(65) Prior Publication Data

US 2016/0040776 A1 Feb. 11, 2016

Related U.S. Application Data

(60) Provisional application No. 62/033,259, filed on Aug. 5, 2014.

(51) Int. Cl.
| | |
|---|---|
| *F16H 57/04* | (2010.01) |
| *F16D 13/74* | (2006.01) |
| *B60K 23/08* | (2006.01) |
| *F16D 25/12* | (2006.01) |

(52) U.S. Cl.
CPC ..... *F16H 57/0473* (2013.01); *F16H 57/0434* (2013.01); *B60K 23/08* (2013.01); *F16D 13/74* (2013.01); *F16D 25/123* (2013.01); *F16D 2300/06* (2013.01); *F16H 57/045* (2013.01)

(58) Field of Classification Search
CPC ............... F16H 57/045; F16H 57/0445; F16H 57/0487; F16H 57/0489; F16H 57/0457; F16H 57/0473; F16D 13/74; F16D 25/123; F16D 2300/06; B60K 23/08–2023/0891
See application file for complete search history.

(56) References Cited

U.S. PATENT DOCUMENTS

| | | | |
|---|---|---|---|
| 4,091,905 A | 5/1978 | Sieren et al. | |
| 4,699,249 A | 10/1987 | Fujiura et al. | |
| 5,366,419 A | 11/1994 | Oda | |
| 5,819,192 A * | 10/1998 | Wakahara | B60K 23/0808 180/247 |
| 6,582,331 B1 | 6/2003 | Baxter, Jr. | |
| 7,743,888 B2 | 6/2010 | Allen et al. | |
| 8,428,838 B2 * | 4/2013 | Kondo | B60K 23/08 701/69 |
| 8,776,950 B2 * | 7/2014 | Quehenberger | B60K 17/02 184/6.12 |
| 9,441,726 B1 * | 9/2016 | Palazzolo | F16H 57/0436 |

(Continued)

FOREIGN PATENT DOCUMENTS

JP 2000142142 A 5/2000

*Primary Examiner* — Ramya Burgess
*Assistant Examiner* — David Morris
(74) *Attorney, Agent, or Firm* — BrooksGroup (57) ABSTRACT

A number of variations may comprise a method comprising: a lubrication system for a transfer case comprising: actively managing an oil level in a plurality of sumps in a transfer case by rotating at least one rotating element in the transfer case to transfer oil through the transfer case to lubricate the transfer case.

18 Claims, 8 Drawing Sheets

(56) References Cited

U.S. PATENT DOCUMENTS

| | | |
|---|---|---|
| 2009/0235781 A1 | 9/2009 | Quehenberger et al. |
| 2010/0180721 A1* | 7/2010 | Quehenberger .... F16H 57/0419 74/606 R |
| 2013/0244830 A1 | 9/2013 | Quehenberger et al. |

* cited by examiner

ECO LUBRICATION METHOD FOR A TRANSFER CASE

CROSS-REFERENCE TO RELATED APPLICATIONS

This application claims the benefit of U.S. Provisional Patent Application No. 62/033,259 filed Aug. 5, 2014.

TECHNICAL FIELD

The field to which the disclosure generally relates to includes transfer cases.

BACKGROUND

A vehicle may include a transfer case.

SUMMARY OF ILLUSTRATIVE VARIATIONS

A number of variations may include a method comprising a lubrication system for a transfer case comprising: actively managing an oil level in a plurality of sumps in a transfer case by rotating at least one rotating element in the transfer case to transfer oil through the transfer case to lubricate the transfer case.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

In a number of variations, a four-wheel-drive system may include any number of transfer case 20 systems including, but not limited to, a hydraulic or an electromagnetic clutch transfer case system.

Figure 1:
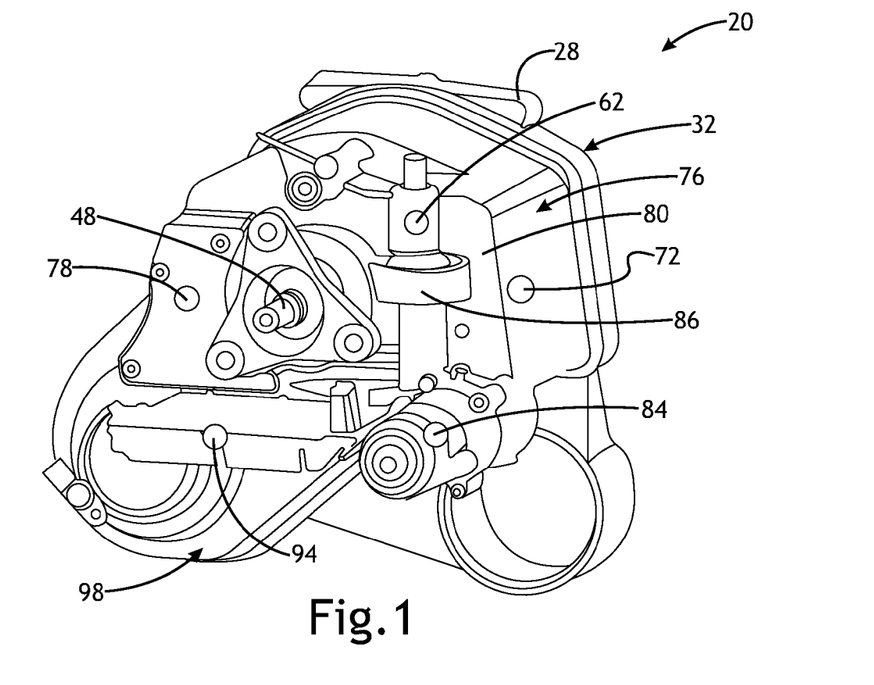
FIG. 1 illustrates a rear view of a transfer case according to a number of variations.
Figure 2:
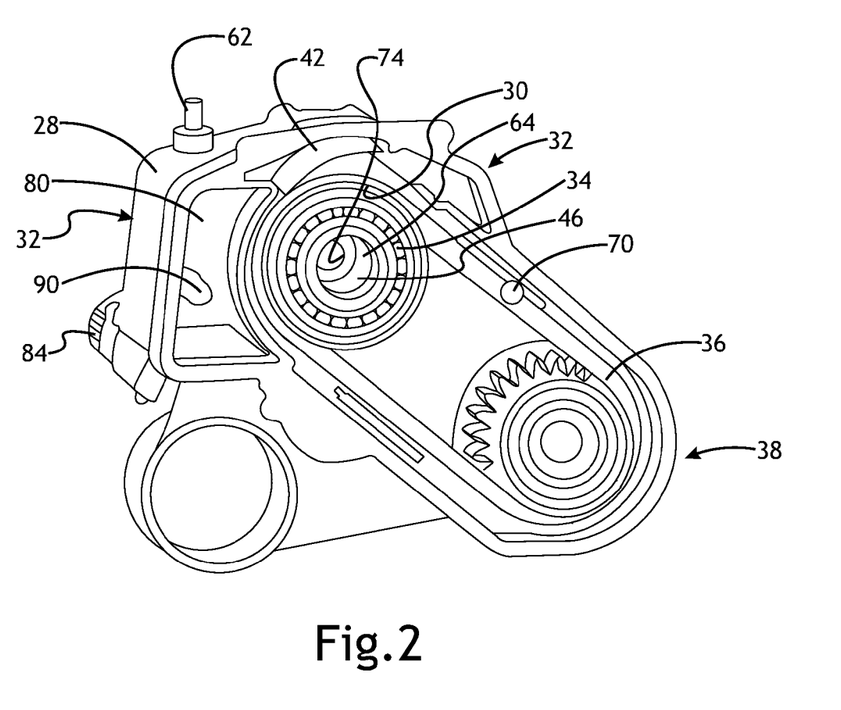
FIG. 2 illustrates a section view of a transfer case according to a number of variations.
Figure 3:
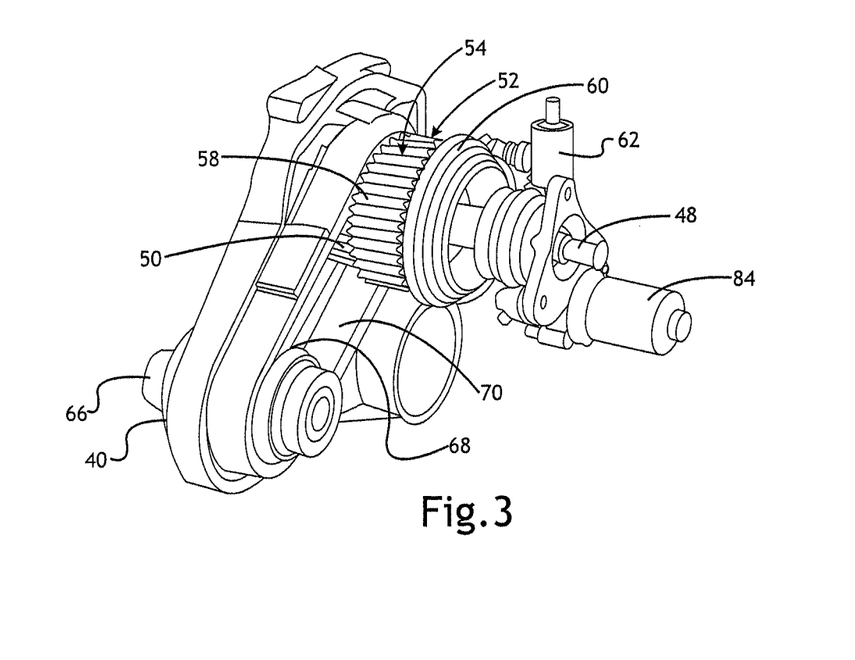
FIG. 3 illustrates a perspective view of a transfer case without a cover according to a number of variations.

Referring to FIGS. 1-3, in a number of variations, a hydraulic clutch transfer case 20 may comprise a housing 28 which may include a first through-hole 30 which may be located in the upper portion 32 of the housing 28 and which may be constructed and arranged to house a first bearing assembly 34. The housing 28 may also include a second through-hole 36 which may be located in the lower portion 38 of the housing 28 and may be constructed and arranged to house a second bearing assembly 40. The bearing assemblies 34, 40 may be any type of bearing assembly including, but not limited to, a ball bearing assembly. The housing 28 may also include an oil catcher 42 which may be adjacent the first through-hole 30. The oil catcher 42 may be integrated into the housing 28 or may be a separate component which may be attached to the housing 28. The housing 28 may further include one or more lubrication channels 92 which may be constructed and arranged to direct oil through the transfer case 20 as will be discussed below.

In a number of variations, the first bearing assembly 34 may include an input shaft cavity 64 which may be constructed and arranged to rotatably house a portion of the input shaft 48. The input shaft 48 may be operatively connected to the rear axles. An upper sprocket 50 may be disposed about the input shaft 48 adjacent the first bearing assembly 34. A clutch pack 52 may be disposed about the input shaft 48 adjacent the upper sprocket 50, for a variation of which is illustrated in FIG. 3. The clutch pack 52 may be operatively associated with the input and output shafts 48, 66 to selectively allow torque to the rear axles or the front and rear axles. The clutch pack 52 may include a clutch housing 54, an inner clutch hub/sprocket 56, and one or more clutch pistons 60. A piston valve 62 may be operatively coupled to the one or more clutch pistons 60.

In a number of variations, the second bearing assembly 40 may include an output shaft cavity (not illustrated) which may be constructed and arranged to accommodate an output shaft 66. The output shaft 66 may extend through the output shaft cavity in a direction opposite to the input shaft 48 and may be operatively connected to the front axles. A lower sprocket 68 may be disposed about the output shaft 66 adjacent the second bearing assembly 40.

In a number of variations, a transfer case chain 70 may extend around each of the upper sprocket 50 and the lower sprocket 68 and may rotate as the upper and lower sprockets 50, 68 rotate with the output and the input shafts 48, 66.

In a number of variations, a housing cover 72 may be attached to at least a portion of the housing 28. In a number of variations, when the cover 72 and the housing 28 are attached together, the bottom portion 96 may comprise a main sump 98. The cover 72 may include a through-hole 74 on the upper portion 76 of the cover 72 which may align with the first through-hole 30 in the housing 28 and may accommodate a portion of the output shaft 66. The cover 72 may be constructed and arranged to include an upper sump 78 which may be adjacent a first side of the through-hole 74 on the cover 72. The cover 72 may also be constructed and arranged to accommodate a pump sump 80 which may be adjacent a second side of the through-hole 74 on the cover 72. The cover 72 may also be constructed and arranged to accommodate an electronic control unit (ECU) as will be discussed hereafter.

In a number of variations, the hydraulic clutch transfer case 20 may include a pressure pump 84 which may extend through a portion of the cover 72 adjacent the pump sump 80. The pump sump 80 may draw oil from the main sump 98. In a number a variations, a filter (not illustrated) may be interposed between the main sump 98 and the pump sump 80 so that oil may travel through the filter to filter out any contaminants before the oil enters into the pump sump 80. In a number of variations the pressure pump 84 may draw oil from the pump sump 80. In another variation, the pump sump 80 may be eliminated and the pressure pump 84 may extend through a portion of the cover 72 adjacent the upper sump 78. Any number of pressure pumps 84 may be used including, but not limited to, a centrifugal electro-hydraulic actuator. The cover 72 may also include a piston valve cavity 86 which may be constructed and arranged to accommodate the piston valve 62 which may be operatively connected to the pressure pump 84. At least a portion of an efficient valve 90 may be disposed within the upper sump 78 and may be operatively connected to the pressure pump 84 or another valve actuating means including, but not limited to, a solenoid, hydraulic pressure, and/or any number of mechanical movements in the transfer case 20 including, but not limited to, the stroke of the clutch piston.

Figure 10:
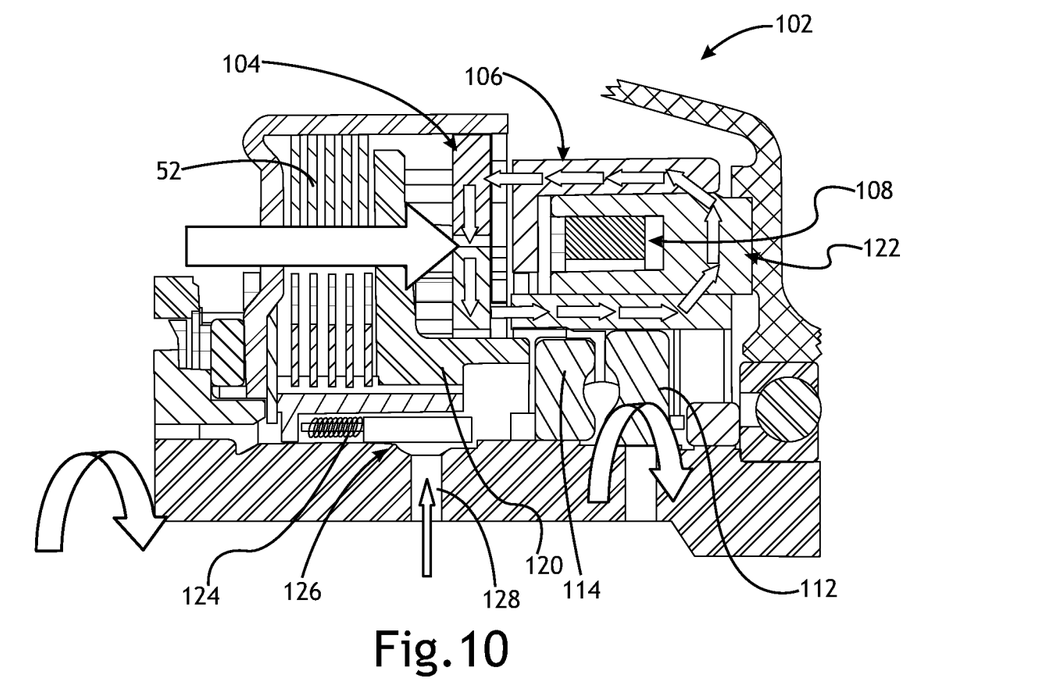
FIG. 10 illustrates a schematic of a transfer case with a cam driven valve according to a number of variations.
Figure 11:
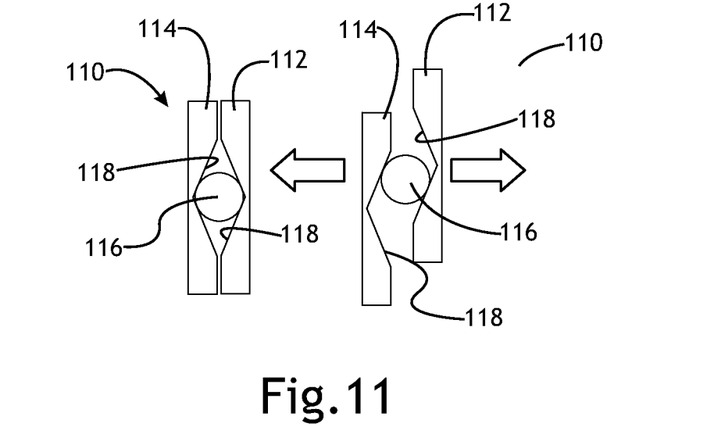
FIG. 11 illustrates a schematic of a ball driven cam according to a number of variations.

In a number of variations, an electromagnetic clutch transfer case 102 may operate similar to that of a hydraulic clutch transfer case 20, and may include similar components as the hydraulic clutch transfer case 102, however, the components may be constructed and arranged so that the clutch pack 52 may be controlled electromagnetically rather than hydraulically. FIGS. 10-16 illustrate a number of variations. In one variation, an electromagnetic clutch transfer case 102 may include an armature 104, a rotor 106, a coil 108 interposed within the rotor 106, a ball cam 110 operatively connected to the rotor 106, an efficient valve 126 operatively associated with the ball cam 110, and a pressure plate 120 operatively connected to a clutch pack 52 and the ball cam 110 which may be located at least partially inside the cover 72 and/or housing 28. In a number of variations, a ball cam 110 may include a base cam 112, an apply cam 114, and a plurality of balls 116 interposed between a plurality of grooves 118 in the base cam 112 and a plurality of grooves 118 in the apply cam 114, a variation of which is illustrated in FIG. 11.

In a number of variations, current may be passed through the coils 108 which may create a magnetic field 122. The magnetic field 122 may then attract the armature 104 which may push the armature 104 against the rotor 106 which may prevent the rotor 106 from rotating. In a number of variations, the rotor 106 and the ball cam 110 may be splined so that when the rotor 106 remains stationary, the base cam 112 may also be prevented from rotation and remain stationary. This may allow the apply cam 114 to rotate independent from the base cam 112 which may also cause the apply cam 114 to move axially (a variation of which is illustrated in FIG. 11) so that it may contact the pressure plate 120 which may activate the clutch pack 52 so that torque may be provided to the input shaft 48 as well as the output shaft 66. The axially movement of the apply cam 114 may also actuate the efficient valve 126.

The efficient valve 90, 126 in both the hydraulic clutch transfer case 20 and the electromagnetic clutch transfer case 102 may be used to control an oil flow into the upper sump 78, as will be discussed hereafter. The cover 72 may also be constructed and arranged to include one or more integrated lubrication channels 92 which may be used to direct oil through the transfer case 20, 102.

Figure 4:
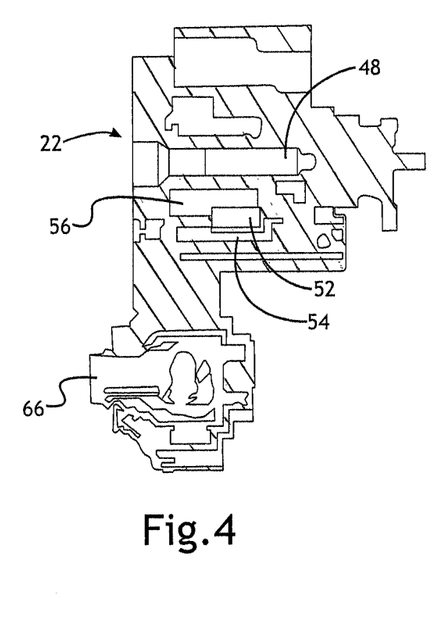
FIG. 4 illustrates rotating elements in a transfer case operating in a standard mode according to a number of variations.
Figure 5:
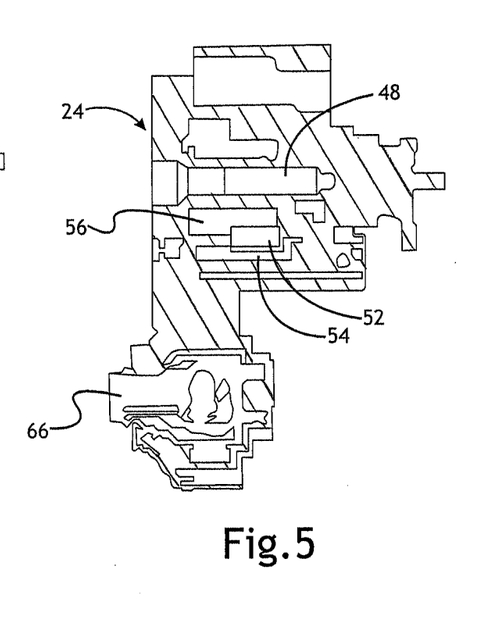
FIG. 5 illustrates rotating elements in a transfer case operating in an efficient mode according to a number of variations.
Figure 6:
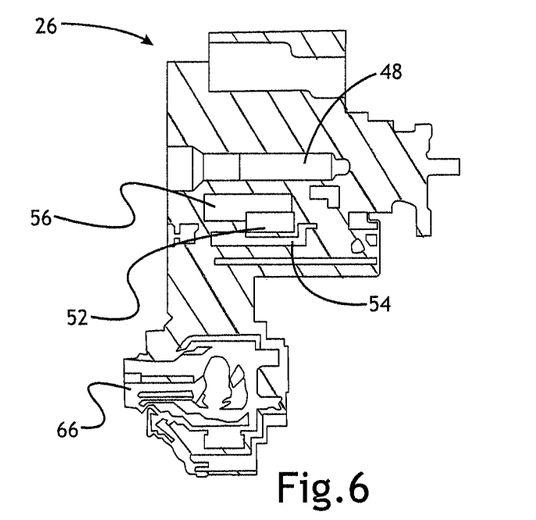
FIG. 6 illustrates rotating elements in a transfer case operating in a disconnect mode according to a number of variations.
Figure 7:
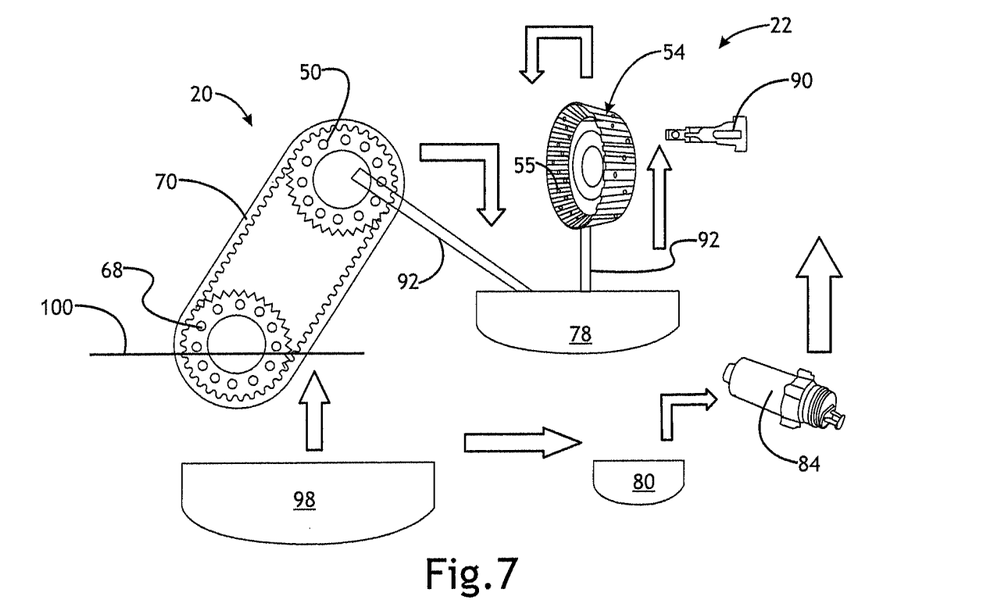
FIG. 7 illustrates a schematic of a lubrication system in a standard mode according to a number of variations.
Figure 8:
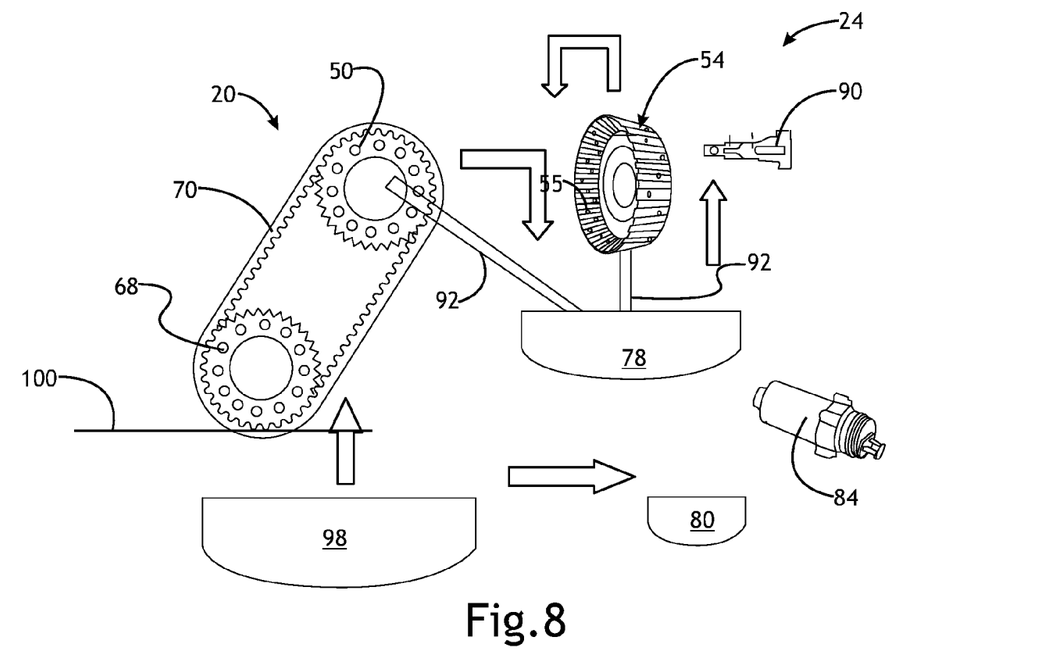
FIG. 8 illustrates a schematic of a lubrication system in an efficient mode according to a number of variations.

Referring to FIGS. 4-6, in a number of variations, a transfer case 20, 102 may split power between a vehicle's front axles and rear axles. In a number of variations, a transfer case 20, 102 may be operatively connected to the transmission as well as the front axles and the rear axles by one or more drive shafts 48, 66. The transfer case 20, 102 may receive power from the transmission. The transfer case 20, 102 may then send the power to the rear axles, or both the rear axles and the front axles through a set of gears or through a chain drive depending on the position of the clutch pack 52. In any number of variations, a transfer case 20, 102 may allow a vehicle to be set to a standard mode 22 or an efficient mode 24. In another variation, the transfer case 20, 102 may also allow the vehicle to be set to a disconnect mode 26.

In a number of variations, the transfer case 20, 102 may be operatively connected to an electronic control unit (ECU) 94 which may be used to control the mode of the transfer case 20, 102. In a number of variations, the ECU 94 may include a main controller and/or a control subsystem which may include one or more controllers (not separately illustrated) in communication with the components of the system and/or other components of the vehicle for receiving and processing sensor input and transmitting output signals. The controller(s) may include one or more suitable processors and memory devices (not separately illustrated). The memory may be configured to provide storage of data and instructions that provide at least some of the functionality of the engine system and that may be executed by the processor(s). At least portions of the method may be enabled by one or more computer programs and various engine system data or instructions, transfer case 20, 102 operating condition data stored in memory as look-up tables, formulas, algorithms, maps, models, or the like. The control subsystem may control the transfer case 20, 102 parameters or parameters of the system by receiving input signals from the sensors, executing instructions or algorithms in light of sensor input signals, and transmitting suitable output signals to the various actuators, and/or components. As used herein, the term "model" may include any construct that represents something using variables, such as a look up table, map, formula, algorithm and/or the like. Models may be application specific and particular to the exact design and performance specifications of any given engine system or of the system. A controller system main controller and/or a control subsystem may include one or more controllers (not separately illustrated) in communication with the components of the system and/or other components of the vehicle for receiving and processing sensor input and transmitting output signals and may be operatively connected to transfer case 20, 102, including, but not limited to, in a method consistent with the illustrated variations described herein.

In a number of variations, a driver may put the vehicle in a standard mode 22 when a driver may want the vehicle to be in 4-wheel drive, for illustrated variation of which is illustrated in FIG. 4. In standard mode 22, the transfer case 20, 102 may provide torque transfer to all four wheels of the vehicle. When a vehicle is in standard mode 22, the output shaft 66 and the input shaft 48 may each be rotating. A driver may put the vehicle in an efficient mode 24 when the driver may not require 4-wheel drive and may require only rear wheel drive, a variation of which is illustrated in FIG. 5. In efficient mode 24, while both the output shaft 66 and the input shaft 48 may be rotating, the clutch pack 52 may be separated or disengaged so that only the rear wheels may be provided with torque. A driver may put the vehicle in a disconnect mode 26 when the driver may not require 4-wheel drive and/or when a driver may want to improve fuel efficiency of the vehicle, a variation of which is illustrated in FIG. 6. In a disconnect mode 26, only the input shaft 48 may be rotating and torque may be provided to the rear axles only, while the output shaft 66 may remain stationary.

In a number of variations, efficient lubrication of the transfer case 20, 102 may be required to help the rotating elements in the transfer case 20, 102 including, but not limited to, gears 50, 68, a clutch pack 52, an input and output shaft 48, 66, and/or a transfer case chain 70, to turn properly and reduce heat which may reduce and/or prevent damage and wear to the transfer case 20, 102 as well as to reduce parasitic losses, which may increase the fuel economy of a vehicle.

In a number of variations, lubrication of a transfer case 20, 102 may be achieved by actively managing multiple sumps 78, 80, 98, the level of oil in the multiple sumps 78, 80, 98, and using rotating elements in the transfer case 20, 102 including, but not limited, a transfer case chain 70, a clutch housing 54, an output shaft 66, and/or an input shaft 48, to act as fluid transfer devices. Various forms of lubrication may be used when the transfer case 20, 102 may be in different operating modes including, a standard mode 22, an efficient mode 24, and a disconnect mode 26. Each of the various lubrication modes 22, 24, 26 may be used in any number of electromagnetic systems or hydraulic systems including, but not limited to, single piston system and dual area piston systems.

Referring to FIGS. 2-4 and 7, in a number of variations, lubrication of a hydraulic clutch transfer case 20 in standard mode 22 may be accomplished by using the rotation of the output shaft 66 and the input shaft 48. As stated above, in a standard mode 22, the input shaft 48 may be rotating and providing torque to the rear axles while the output shaft 66 may also be rotating to provide torque to the front axles. This may cause the upper and lower chain sprockets 50, 68 to rotate which may cause the transfer case chain 70 to rotate. In standard mode 22, the oil level 100 in the main sump 98 may be at a level so that the oil may cover at least a portion of the lower chain sprocket 68 and the transfer case chain 70. The transfer case chain 70 may then act as a slinger pump as it rotates by picking up or causing the oil from the main sump 98 to move from the main sump 98 to the upper sump 78 in the transfer case 20. The oil may be further directed from the main sump 98 to the upper sump 78 through the one or more lubrication channels 92 which may be integrated into the cover 72 and/or the housing 28. The oil catcher 42 may further direct oil moving from the transfer case chain 70 from the main sump 98 into the upper sump 78 and/or through the integrated lubrication channels 92.

Oil from the upper sump 78 may then be used to lubricate the first bearing assembly 34 (a variation of which is illustrated in FIG. 2) and clutch pack 52 (a variation of which is illustrated in FIG. 3). The upper sump 78 may be operatively connected to one or more lubrication channels 92 which may lead to the first bearing assembly 34 and/or the input shaft cavity 64. The oil may then be directed from the upper sump 78 to the first bearing assembly 34 and/or the inner clutch hub/sprocket 56 (variations of which are illustrated in FIGS. 4-6) of the clutch pack 52 as well as any number of surrounding components including, but not limited to, one or more seals, through the one or more lubrication channels 92 in the cover 72 and/or housing 28. Oil may then enter into the clutch pack 52 to the inner clutch hub/sprocket 56 (variations of which are illustrated in FIGS. 4-6) of the clutch housing 54. The clutch housing 54 may include one or more openings 55 which may allow oil from the inner clutch hub/sprocket 56 of the clutch housing 54 to be drawn out of the clutch housing 54 by centrifugal forces. Oil from the clutch housing 54 may then be returned to the upper sump 78 and the main sump 98 as the clutch housing 54 rotates.

Further, in a number of variations, oil may also be directed from the main sump 98 to a pump sump 80. In a number of variations, any number of filters (not illustrated) may be interposed between the main sump 98 and the pump sump 80 which may help filter out any contaminants which may be in the oil. A pressure pump 84 may draw oil from the pump sump 80 and may use the oil to send hydraulic pressure to the piston valve 62 which may cause the piston valve 62 to open which may allow pressure to the clutch piston(s) 60 which may activate or engage the clutch pack 52 so that both the front and rear axles are provided torque from the output and the input shafts 66, 48. The pressure pump 84 may also send pressure to the efficient valve 90 which may cause the efficient valve 90 to open which may increase the flow of oil from the upper sump 78 to the clutch pack 52.

Referring to FIGS. 2-3, 5 and 8, in a number of variations, lubrication of the hydraulic clutch transfer case 20 in efficient mode 24 may be accomplished by using the rotation of the input shaft 48 and the output shaft 66. As stated above, in efficient mode 24, while the clutch pack 52 may be disengaged or separated so that torque may be provided to only the rear axles, both the input shaft 48 and the output shaft 66 may each remain rotating. In efficient mode 24, lubrication may be accomplished much like standard mode wherein the upper and lower chain sprockets 50, 68 may rotate which may cause the transfer case chain 70 to rotate. In efficient mode 24, the oil level 100 in the main sump 98 may be lower than in standard mode 22 and may cover at least a portion of the transfer case chain 70. The transfer case chain 70 may act as a slinger pump as it rotates by picking up or causing the oil from the main sump 98 to move from the main sump 98 to the upper sump 78 in the transfer case 20. The oil may be further directed from the main sump 98 to the upper sump 78 through one or more lubrication channels 92 which may be integrated into the cover 72 or the housing 28. The oil catcher 42 may further direct oil moving from the transfer case chain 70 from the main sump 98 into the upper sump 78 and/or through the integrated lubrication channels 92.

Oil from the upper sump 78 may then be used to lubricate the first bearing assembly 34 (a variation of which is illustrated in FIG. 2) and the clutch pack 52 (a variation of which is illustrated in FIG. 3). The upper sump 78 may be operatively connected to the one or more lubrication channels 92 which may lead to the first bearing assembly 34 and/or the input shaft cavity 64 (a variation of which is illustrated in FIG. 2). The oil may then be directed from the upper sump 78 to the first bearing assembly 34 and/or the inner clutch hub/sprocket 56 (variations of which are illustrated in FIGS. 4-6) of the clutch housing 54 as well as any number of surrounding components including, but not limited to, one or more seals. Oil may be drawn from the inner clutch hub/sprocket 56 and out of the clutch housing 54 by centrifugal forces, as discussed above. Oil from the clutch housing 54 may then be returned to the upper sump 78 and the main sump 98 as the clutch housing 54 rotates.

In efficient mode 24, the pressure pump 84 may be deactivated which may eliminate or reduce pressure to the one or more clutch pistons 60 so that torque may be provided to the rear axles only. This may also eliminate and/or reduce pressure to the efficient valve 90 so that the efficient valve 90 may be at least partially closed which may reduce the flow of oil into the clutch pack 52 which may reduce drag losses from the rotation of the transfer case chain 70 in the oil.

Figure 9:
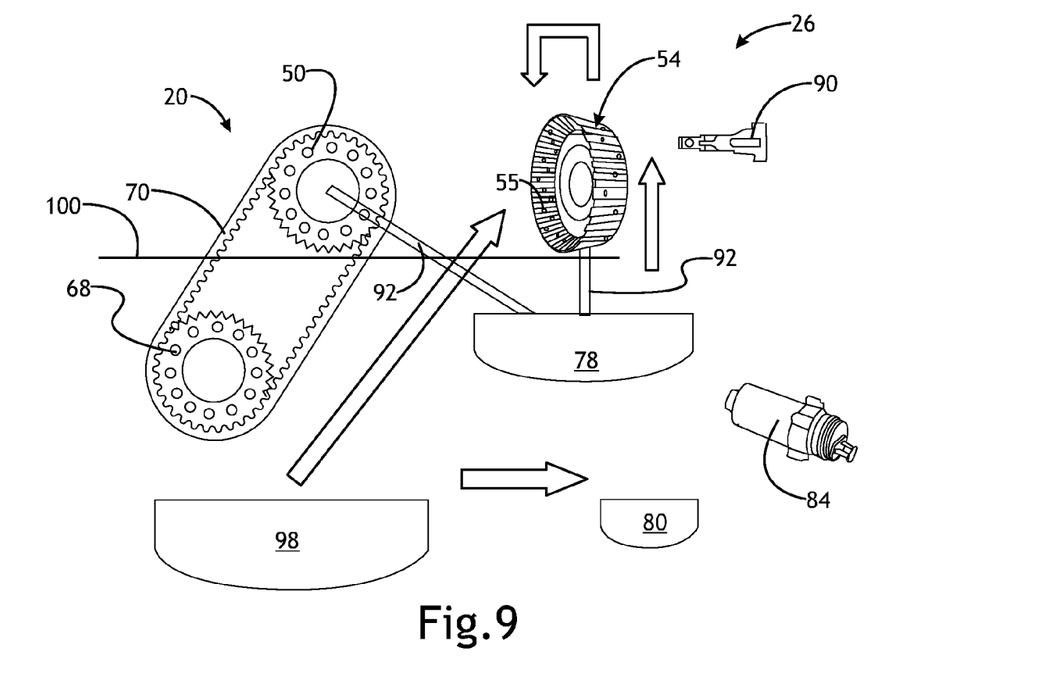
FIG. 9 illustrates a schematic of a lubrication system in a disconnect mode according to a number of variations.

Referring to FIGS. 2-3, 6 and 9, in a number of variations, lubrication of the hydraulic clutch transfer case 20 in a disconnect mode 26 may be accomplished by using the rotation of any number of elements which may be operatively connected to the input shaft 48 including, but not limited to, the clutch housing 54 (a variation of which is illustrated in FIG. 9). As stated above, in a disconnect mode 26, only the input shaft 48 may be rotating and providing torque to the rear axles while the output shaft 66 may remain stationary. This may cause the transfer case chain 70 to remain idle and disconnected from rotation. In a disconnect mode 26, the oil level 100 in the main sump 98 may rise to a level so that it may contact at least a portion of at least one rotating element 54 operatively connected to the input shaft 48. The element 54 operatively connected to the input shaft 48 may then function as a paddle wheel and may move oil upward into the upper sump 78. In another variation, a separate slinger device (not illustrated) may be used to move oil upward into the upper sump 78. The oil catcher 42 and/or the one or more integrated lubrication channels 92 may further direct oil moving from the rotation of the clutch housing 54 into the upper sump 78.

Oil from the upper sump 78 may then be used to lubricate the first bearing assembly 34 (a variation of which is illustrated in FIG. 2) and/or the clutch pack 52 (a variation of which is illustrated in FIG. 3). As in standard mode 22 and efficient mode 24, the one or more lubrication channels 92 may lead to the first bearing assembly 34 and/or the input shaft cavity 64 (a variation of which is illustrated in FIG. 2). The oil may then be directed from the upper sump 78 to the first bearing assembly 34 and/or the inner clutch hub/sprocket 56 (variations of which are illustrated in FIGS. 4-6) of the clutch housing 54 as well as any number of surrounding components including, but not limited to, one or more seals. Oil may then be drawn from the inner clutch hub/sprocket 56 and out of the clutch housing 54 by centrifugal forces, as discussed above. Oil from the clutch housing 54 may then be returned to the upper sump 78 as the clutch housing 54 rotates.

In the disconnect mode 26, the pressure pump 84 may be deactivated which may eliminate or reduce pressure to the clutch piston(s) 60 so that torque may be provided to the rear axles only. This may also eliminate and/or reduce pressure to the efficient valve 90 so that the efficient valve 90 may be at least partially closed which may reduce the flow of oil into the clutch pack 52.

FIGS. 10-14 illustrate a number of variations. In one variation, lubrication of an electromagnetic clutch transfer case 102 in standard mode 22 may be accomplished by using the rotation of the output shaft 66 and the input shaft 48, as discussed above. In a standard mode 22, the input shaft 48 may be rotating and providing torque to the rear axles while the output shaft 66 may also be rotating to provide torque to the front axles. This may cause the upper and lower chain sprockets 50, 68 to rotate which may cause the transfer case chain 70 to rotate. In standard mode 22, the oil level 100 in the main sump 98 may be at a level so that the oil may cover at least a portion of the lower chain sprocket 68 and the transfer case chain 70. The transfer case chain 70 may then act as a slinger pump as it rotates by picking up or causing the oil from the main sump 98 to move from the main sump 98 to the upper sump 78 in the transfer case 20. The oil may be further directed from the main sump 98 to the upper sump 78 through the one or more lubrication channels 92 which may be integrated into the cover 72 and/or the housing 28. The oil catcher 42 (a variation of which is illustrated in FIG. 2) may further direct oil moving from the transfer case chain 70 from the main sump 98 into the upper sump 78 and/or through the integrated lubrication channels 92.

Oil from the upper sump 78 may then be used to lubricate the clutch pack 52 and any number of surrounding components including, but not limited to, one or more bearings and/or seals. The upper sump 78 may be operatively connected to one or more lubrication channels 92 which may lead to the input shaft cavity 64 (a variation of which is illustrated in FIG. 2). The oil may then be directed from the upper sump 78 to the inner clutch hub/sprocket 56 of the clutch pack 52 through the one or more lubrication channels 92 in the cover 72 and/or housing 28. Oil may then enter into the clutch pack 52 to the inner clutch hub/sprocket 56 of the clutch housing 54. The clutch housing 54 may include one or more openings 55 which may allow oil from the inner clutch hub/sprocket 56 of the clutch housing 54 to be drawn out of the clutch housing 54 by centrifugal forces. Oil from the clutch housing 54 may then be returned to the upper sump 78 and the main sump 98 as the clutch housing 54 rotates.

Figure 12:
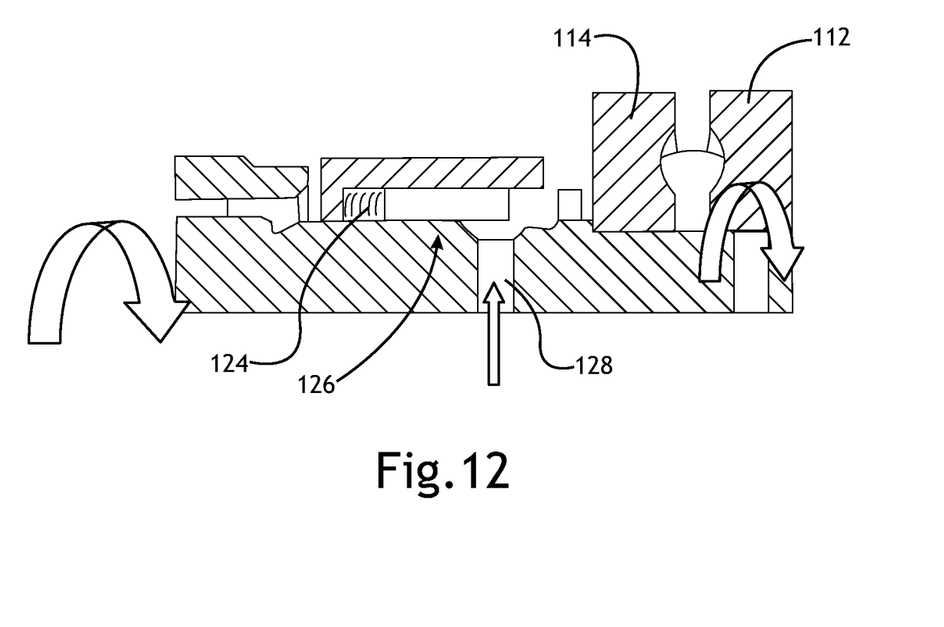
FIG. 12 illustrates a schematic of a cam driven valve according to a number of variations.
Figure 13:
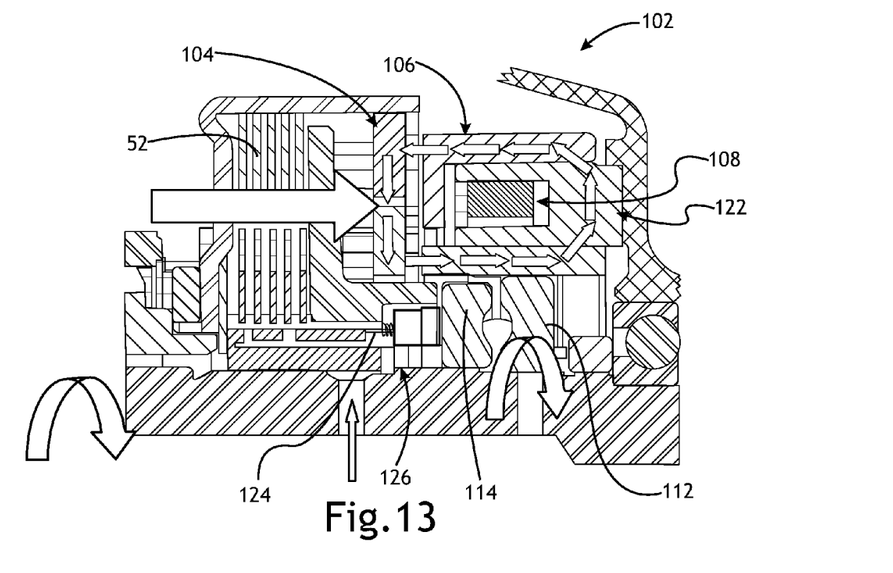
FIG. 13 illustrates a schematic of a transfer case with a cam driven valve according to a number of variations.
Figure 14:
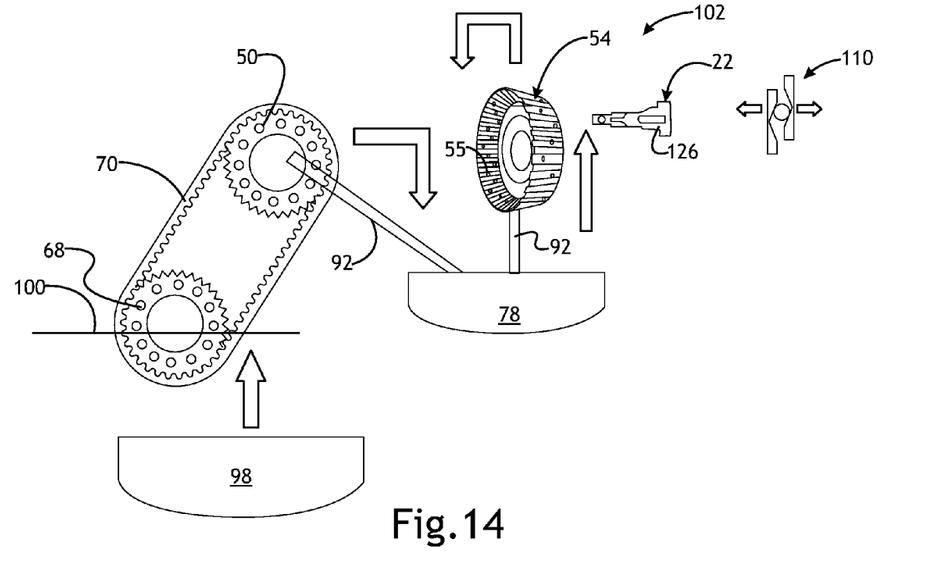
FIG. 14 illustrates a schematic of a lubrication system in a standard mode according to a number of variations.

As discussed above, current may be passed through the coils 108 to activate the clutch pack 52 through the axial movement of the apply cam 114. The axial movement of the apply cam 114 may also cause the efficient valve 126 to move to a second position which may allow oil from a positive displacement pump through a channel 128 operatively connected to the positive displacement pump to provide lubrication to the clutch pack 52 and/or surrounding components including, but not limited to, one or more seals or bearings, through the one or more lubrication channels 92, a variation of which is illustrated in FIG. 10. In a number of variations, the efficient valve 126 may also include a spring and ball 124 which may allow the lubrication channel 128 to open when the ball cam 110 may be applying force. In a number of variations, the efficient valve 126 may be at least partially closed when the clutch pack 52 is not be activated which may prevent or reduce the flow of oil from the lubrication channel 128, a variation of which is illustrated in FIG. 12. In another variation, a positive displacement pump may not be used, a variation of which is illustrated in FIG. 13. In this variation, the oil may travel through lubrication channels 92 from any number of sources including, but not limited to, the upper sump 78, when the clutch pack 52 may be activated.

Figure 15:
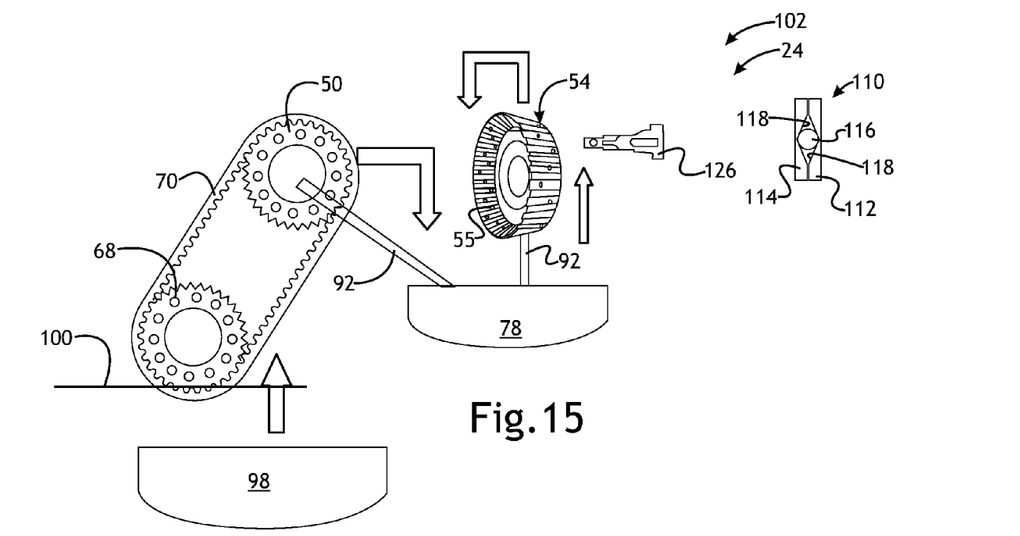
FIG. 15 illustrates a schematic of a lubrication system in an efficient mode according to a number of variations.

FIG. 15 illustrates a number of variations. In one variation, lubrication of the electromagnetic clutch transfer case 102 in efficient mode 24 may be accomplished by using the rotation of the input shaft 48 and the output shaft 66. As stated above, in efficient mode 24, while the clutch pack 52 may be disengaged or separated so that torque may be provided to only the rear axles, both the input shaft 48 and the output shaft 66 may each remain rotating. In efficient mode 24, lubrication may be accomplished much like standard mode wherein the upper and lower chain sprockets 50, 68 may rotate which may cause the transfer case chain 70 to rotate. In efficient mode 24, the oil level 100 in the main sump 98 may be lower than in standard mode 22 and may cover at least a portion of the transfer case chain 70. The transfer case chain 70 may act as a slinger pump as it rotates by picking up or causing the oil from the main sump 98 to move from the main sump 98 to the upper sump 78 in the transfer case 102. The oil may be further directed from the main sump 98 to the upper sump 78 through one or more lubrication channels 92 which may be integrated into the cover 72 or the housing 28. The oil catcher 42 may further direct oil moving from the transfer case chain 70 from the main sump 98 into the upper sump 78 and/or through the integrated lubrication channels 92.

Oil from the upper sump 78 may then be used to lubricate the first bearing assembly 34 (a variation of which is illustrated in FIG. 2) and/or the clutch pack 52 (a variation of which is illustrated in FIG. 3) as well as any number of surrounding components including, but not limited to, one or more seals. The upper sump 78 may be operatively connected to the one or more lubrication channels 92 which may lead to the first bearing assembly 34 and/or the input shaft cavity 64 (a variation of which is illustrated in FIG. 2). The oil may then be directed from the upper sump 78 to the first bearing assembly 34 and the inner clutch hub/sprocket 56 of the clutch housing 54. Oil may then be drawn from the inner clutch hub/sprocket 56 and out of the clutch housing 54 by centrifugal forces, as discussed above. Oil from the clutch housing 54 may then be returned to the upper sump 78 and the main sump 98 as the clutch housing 54 rotates.

In efficient mode 24, the coils 108 may not be provided with current which may allow the base cam 112 and the apply cam 114 to rotate together and may prevent axial movement of the apply cam 114. This may prevent oil from the positive displacement pump and/or any number of lubrication sources, to enter into the lubrication channels 92 which may reduce the flow of oil into the clutch pack 52 which may reduce drag losses from the rotation of the transfer case chain 70 in the oil.

Figure 16:
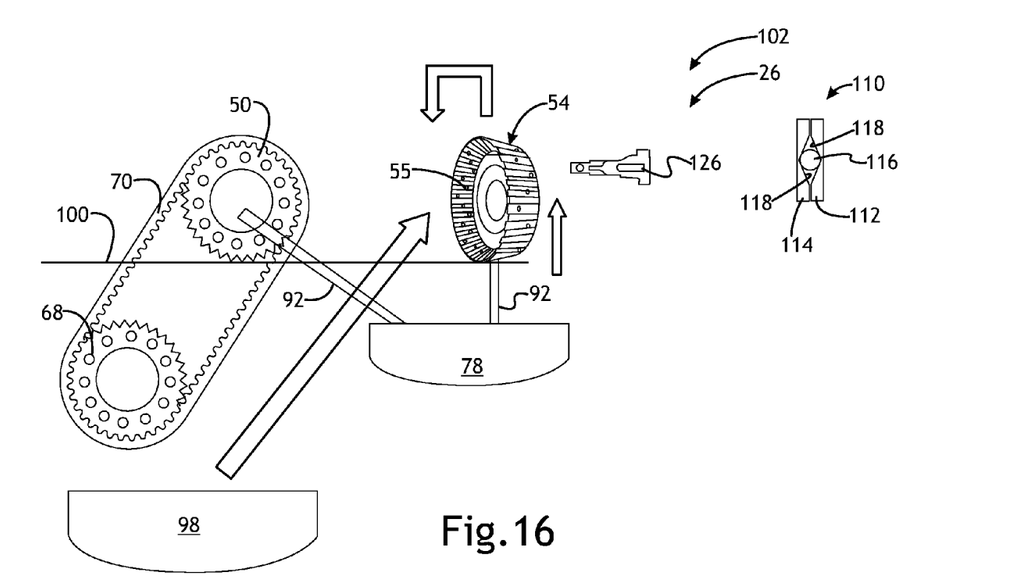
FIG. 16 illustrates a schematic of a lubrication system in a disconnect mode according to a number of variations.

FIG. 16 illustrates a number of variations. In one variation, lubrication of the electromagnetic clutch transfer case 102 in a disconnect mode 26 may be accomplished by using the rotation of any number of elements which may be operatively connected to the input shaft 48 including, but not limited to, the clutch housing 54. As stated above, in a disconnect mode 26, only the input shaft 48 may be rotating and providing torque to the rear axles while the output shaft 66 may remain stationary. This may cause the transfer case chain 70 to remain idle and disconnected from rotation. In a disconnect mode 26, the oil level 100 in the main sump 98 may rise to a level so that it may contact at least a portion of at least one rotating element 54 operatively connected to the input shaft 48. The rotating element 54 operatively connected to the input shaft 48 may then function as a paddle wheel and may move oil upward into the upper sump 78. In another variation, a separate slinger device (not illustrated) may be used to move oil upward into the upper sump 78. The oil catcher 42 and/or the one or more integrated lubrication channels 92 may further direct oil moving from the rotation of the rotating element 54 into the upper sump 78.

Oil from the upper sump 78 may then be used to lubricate the clutch pack 52 and any number of surrounding components including, but not limited to, one or more bearings and/or seals. As in standard mode 22 and efficient mode 24, the one or more lubrication channels 92 may lead to the first the input shaft cavity 64 and/or surrounding components. The oil may then be directed from the upper sump 78 to the inner clutch hub/sprocket 56 of the clutch housing 54. Oil may then be drawn from the inner clutch hub/sprocket 56 and out of the clutch housing 54 by centrifugal forces, as discussed above. Oil from the clutch housing 54 may then be returned to the upper sump 78 as the clutch housing 54 rotates.

In disconnect mode 26, the coils 108 may not be provided with current which may allow the base cam 112 and the apply cam 114 to rotate together and may prevent axial movement of the apply cam 114. This may prevent oil from the positive displacement pump and/or any number of lubrication sources to enter into the lubrication channels 92 which may reduce the flow of oil into the clutch pack 52 which may reduce drag losses from the rotation of the transfer case chain 70 in the oil.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a method comprising: a lubrication system for a transfer case comprising: lubricating a transfer case in a first mode by directing oil from a first sump in the transfer case to a second sump in the transfer case using the rotation of a transfer case chain operatively connected to an output shaft, directing oil from the second sump to at least one of an input shaft or a clutch pack through at least one oil channel, and increasing oil flow from the second sump to the clutch pack by opening a valve adjacent the clutch pack; and lubricating the transfer case in a second mode by directing oil from the first sump in the transfer case to the second sump in the transfer case using the rotation of the transfer case chain operatively connected to the output shaft, directing oil from the second sump to at least one of the input shaft or the clutch pack through the at least one oil channel, and wherein the valve is at least partially closed to reduce the flow of oil from the second sump to the clutch pack.

Variation 2 may include a method as set forth in Variation 1 further comprising lubricating the transfer case in a third mode by directing oil from the first sump to the second sump using the rotation of at least one clutch component, directing oil from the second sump to at least one of the input shaft or the clutch pack through the at least one oil channel, and wherein the valve is at least partially closed to reduce the flow of oil from the second sump to the clutch pack.

Variation 3 may include a method as set forth in any of Variations 1-2 wherein the transfer case is a hydraulic clutch transfer case, and wherein the valve is actuated by a pump.

Variation 4 may include a method as set forth in any of Variations 1-2 wherein the transfer case is an electromagnetic clutch transfer case, and wherein the valve is actuated by a ball cam.

Variation 5 may include a method comprising: a lubrication system for a transfer case comprising: actively managing an oil level in a plurality of sumps in a transfer case by rotating at least one rotating element in the transfer case to transfer oil through the transfer case to lubricate the transfer case.

Variation 6 may include a method as set forth in Variation 5 wherein the at least one rotating element includes at least one of an input shaft, an output shaft, or a clutch pack, and wherein the plurality of sumps include a first sump and at least one second sump, wherein the first sump is located in a bottom portion of the transfer case, and wherein the at least one second sump is located adjacent the input shaft.

Variation 7 may include a method as set forth in any of Variations 5 and 6 wherein the transfer case operates in a first mode, a second mode, and a third mode, wherein lubrication in the first mode comprises rotating a transfer case chain operatively connected to the output shaft to draw oil from the first sump to the at least one second sump, and moving oil from the at least one second sump to at least one of an input shaft bearing assembly or a clutch pack through at least one oil channel; wherein lubrication in the second mode comprises rotating the transfer case chain operatively connected to the output shaft to draw oil from the first sump to the at least one second sump, and moving oil from the at least one second sump to at least one of the input shaft bearing or the clutch pack through the at least one oil channel; and wherein lubrication in the third mode comprises rotating at least one element operatively connected to the input shaft to move oil from the main sump to the upper sump, and moving oil from the at least one second sump to at least one of the input shaft bearing assembly or the clutch pack through the at least one oil channel.

Variation 8 may include a method as set forth in any of Variations 5-7 further comprising increasing the flow of oil to the clutch pack in the first mode by opening a valve adjacent the clutch pack.

Variation 9 may include a method as set forth in any of Variations 5-8 wherein the valve is actuated by a pump.

Variation 10 may include a method as set forth in any of Variations 5-8 wherein the valve is actuated by a ball cam.

Variation 11 may include a method as set forth in any of Variations 5-10 wherein the transfer case further comprises an oil catcher adjacent the clutch pack which is constructed and arranged to direct oil from the first sump into the at least one second sump.

Variation 12 may include a product comprising: a lubrication system for a transfer case comprising: a transfer case comprising an input shaft rotatably positioned in a first bearing assembly; a first chain sprocket operatively connected to the input shaft; an output shaft rotatably positioned in a second bearing assembly; a second chain sprocket operatively connected to the output shaft; a main sump adjacent the second chain sprocket; a transfer case chain operatively connected to the first and second sprocket; a clutch pack operatively connected to the input shaft adjacent the first chain sprocket; at least one upper sump adjacent the input shaft; at least one oil channel operatively connected between the upper sump and at least one of the first bearing assembly or the clutch pack; a valve operatively connected to the upper sump and adjacent the clutch pack; a housing and a cover, wherein the housing and the cover surround at least a portion of the transfer case; and at least one lubrication channel integrated into at least one of the housing or the cover; wherein the transfer case is constructed and arranged to operate in a first mode and a second mode, wherein in the first mode the input and the output shaft rotate which causes the transfer case chain to rotate, wherein the clutch pack is engaged; and wherein in the second mode the input shaft and the output shaft rotate which causes the transfer case chain to rotate, wherein the clutch pack is disengaged; wherein in the first mode the transfer case chain draws oil from the main sump and directs it to the upper sump, wherein oil is directed from the upper sump to at least one of the first bearing assembly or the clutch pack through the at least one oil channel, and wherein when the clutch is engaged, the valve is constructed and arranged to open to increase oil flow from the upper sump into the clutch pack; and wherein in the second mode the transfer case chain draws oil from the main sump and directs it to the upper sump, wherein oil from the upper sump is directed to at least one of the first bearing assembly or the clutch pack through the at least one oil channel, and wherein the valve is constructed and arranged to at least partially close when the clutch pack is disengaged to reduce the flow of oil from the upper sump into the clutch pack.

Variation 13 may include a product as set forth in Variation 12 wherein the transfer case is further constructed and arranged to operate in a third mode, wherein in the third mode the input shaft rotates and the output shaft and the transfer case chain remain idle, and wherein the clutch pack is disengaged; and wherein in the third mode, the idling of the transfer case chain causes oil in the main sump to rise to contact the clutch pack, wherein the clutch pack moves oil from the main sump to the upper sump, wherein oil is directed from the upper sump to at least one of the input bearing assembly or the clutch pack through the at least one oil channel, and wherein the valve is at least partially closed to reduce the flow of oil from the upper sump into the clutch pack.

Variation 14 may include a product as set forth in any of Variations 12 and 13 wherein a pump causes engagement of the clutch pack, and wherein the pump actuates the valve.

Variation 15 may include a product as set forth in any of Variations 12 and 13 wherein a ball cam causes engagement of the clutch pack, and wherein the ball cam actuates the valve.

Variation 16 may include a product as set forth in any of Variations 12-15 wherein the housing further comprises an oil catcher adjacent the clutch pack which is constructed and arranged to direct oil from the main sump to into the upper sump.

Variation 17 may include a product as set forth in any of Variations 12-16 wherein the at least one upper sump is integrated into the cover.

Variation 18 may include a product as set forth in any of Variations 12-17 wherein the main sump is integrated into a lower portion of the housing and the cover.

Variation 19 may include a product as set forth in any of Variations 12-18 wherein the at least one oil channel is integrated into at least one of the housing or the cover.

Variation 20 may include a product as set forth in any of Variations 12-19 wherein oil directed to the clutch pack enters the clutch pack and travels from an inner clutch housing to an outer clutch housing through centrifugal forces and wherein oil from the outer clutch housing is directed back into the main sump and the upper sump.

The above description of select variations within the scope of the invention is merely illustrative in nature and, thus, variations or variants thereof are not to be regarded as a departure from the spirit and scope of the invention.

What is claimed is:
1. A method of lubricating a transfer case comprising:
lubricating the transfer case in a first mode by directing oil from a first sump in the transfer case to a second sump in the transfer case using the rotation of a transfer case chain operatively connected to an output shaft, directing oil from the second sump to at least one of an input shaft or a clutch pack through at least one oil channel, and increasing oil flow from the second sump to the clutch pack by opening a valve adjacent the clutch pack;

lubricating the transfer case in a second mode by directing oil from the first sump in the transfer case to the second sump in the transfer case using the rotation of the transfer case chain operatively connected to the output shaft, directing oil from the second sump to at least one of the input shaft or the clutch pack through the at least one oil channel, and wherein the valve is at least partially closed to reduce the flow of oil from the second sump to the clutch pack; and lubricating the transfer case in a third mode by directing oil from the first sump to the second sump using the rotation of at least one clutch component, directing oil from the second sump to at least one of the input shaft or the clutch pack through the at least one oil channel, and wherein the valve is at least partially closed to reduce the flow of oil from the second sump to the clutch pack.

2. The method of claim 1 wherein the transfer case is a hydraulic clutch transfer case, and wherein the valve is actuated by a pump.

3. The method of claim 1 wherein the transfer case is an electromagnetic clutch transfer case, and wherein the valve is actuated by a ball cam.

4. A method of lubricating a transfer case comprising:
actively managing an oil level in a plurality of sumps in the transfer case by rotating at least one rotating element in the transfer case to transfer oil through the transfer case to lubricate the transfer case, wherein the transfer case operates in a first mode, a second mode, and a third mode, wherein lubrication in the first mode comprises rotating a transfer case chain operatively connected to an output shaft to draw oil from a first sump to at least one second sump, and moving oil from the at least one second sump to at least one of an input shaft bearing assembly or a clutch pack through at least one oil channel; wherein lubrication in the second mode comprises rotating the transfer case chain operatively connected to the output shaft to draw oil from the first sump to the at least one second sump, and moving oil from the at least one second sump to at least one of the input shaft bearing or the clutch pack through the at least one oil channel; and wherein lubrication in the third mode comprises rotating at least one element operatively connected to the input shaft to move oil from the first sump to the at least one second sump, and moving oil from the at least one second sump to at least one of the input shaft bearing assembly or the clutch pack through the at least one oil channel.

5. The method of claim 4 wherein the at least one rotating element includes at least one of an input shaft, an output shaft, or a clutch pack, and wherein the plurality of sumps include a first sump and at least one second sump, wherein the first sump is located in a bottom portion of the transfer case, and wherein the at least one second sump is located adjacent the input shaft.

6. The method of claim 4 further comprising increasing the flow of oil to the clutch pack in the first mode by opening a valve adjacent the clutch pack.

7. The method of claim 6 wherein the valve is actuated by a pump.

8. The method of claim 6 wherein the valve is actuated by a ball cam.

9. The method of claim 4 wherein the transfer case further comprises an oil catcher adjacent the clutch pack which is constructed and arranged to direct oil from the first sump into the at least one second sump.

10. A product comprising:
a transfer case comprising an input shaft rotatably positioned in a first bearing assembly; a first chain sprocket operatively connected to the input shaft; an output shaft rotatably positioned in a second bearing assembly; a second chain sprocket operatively connected to the output shaft; a main sump adjacent the second chain sprocket; a transfer case chain operatively connected to the first and second sprocket; a clutch pack operatively connected to the input shaft adjacent the first chain sprocket; at least one upper sump adjacent the input shaft; at least one oil channel operatively connected between the upper sump and at least one of the first bearing assembly or the clutch pack; a valve operatively connected to the upper sump and adjacent the clutch pack; a housing and a cover, wherein the housing and the cover surround at least a portion of the transfer case; and at least one lubrication channel integrated into at least one of the housing or the cover;

wherein the transfer case is constructed and arranged to operate in a first mode, a second mode, and a third mode, wherein in the first mode the input and the output shaft rotate which causes the transfer case chain to rotate, wherein the clutch pack is engaged; and wherein in the second mode the input shaft and the output shaft rotate which causes the transfer case chain to rotate, wherein the clutch pack is disengaged; wherein in the first mode the transfer case chain draws oil from the main sump and directs it to the upper sump, wherein oil is directed from the upper sump to at least one of the first bearing assembly or the clutch pack through the at least one oil channel, and wherein when the clutch is engaged, the valve is constructed and arranged to open to increase oil flow from the upper sump into the clutch pack;

wherein in the second mode the transfer case chain draws oil from the main sump and directs it to the upper sump, wherein oil from the upper sump is directed to at least one of the first bearing assembly or the clutch pack through the at least one oil channel, and wherein the valve is constructed and arranged to at least partially close when the clutch pack is disengaged to reduce the flow of oil from the upper sump into the clutch pack; and wherein in the third mode the input shaft rotates and the output shaft and the transfer case chain remain idle, and wherein the clutch pack is disengaged; and wherein in the third mode, the idling of the transfer case chain causes oil in the main sump to rise to contact the clutch pack, wherein the clutch pack moves oil from the main sump to the upper sump, wherein oil is directed from the upper sump to at least one of the input bearing assembly or the clutch pack through the at least one oil channel, and wherein the valve is at least partially closed to reduce the flow of oil from the upper sump into the clutch pack.

11. The product of claim 10 wherein a pump causes engagement of the clutch pack, and wherein the pump actuates the valve.

12. The product of claim 10 wherein a ball cam causes engagement of the clutch pack, and wherein the ball cam actuates the valve.

13. The product of claim 10 wherein the housing further comprises an oil catcher adjacent the clutch pack which is constructed and arranged to direct oil from the main sump to into the upper sump.

14. The product of claim 10 wherein the at least one upper sump is integrated into the cover.

15. The product of claim 10 wherein the main sump is integrated into a lower portion of the housing and the cover.

16. The product of claim 10 wherein the at least one oil channel is integrated into at least one of the housing or the cover.

17. The product of claim 10 wherein oil directed to the clutch pack enters the clutch pack and travels from an inner clutch housing to an outer clutch housing through centrifugal forces and wherein oil from the outer clutch housing is directed back into the main sump and the upper sump.

18. A product comprising:
a transfer case comprising an input shaft rotatably positioned in a first bearing assembly; a first chain sprocket operatively connected to the input shaft; an output shaft rotatably positioned in a second bearing assembly; a second chain sprocket operatively connected to the output shaft; a main sump adjacent the second chain sprocket; a transfer case chain operatively connected to the first and second sprocket; a clutch pack operatively connected to the input shaft adjacent the first chain sprocket; at least one upper sump adjacent the input shaft; at least one oil channel operatively connected between the upper sump and at least one of the first bearing assembly or the clutch pack; a valve operatively connected to the upper sump and adjacent the clutch pack; a housing and a cover, wherein the housing and the cover surround at least a portion of the transfer case; at least one lubrication channel integrated into at least one of the housing or the cover; and an oil catcher adjacent the clutch pack which is constructed and arranged to direct oil from the main sump into the upper sump.

* * * * *